(12) United States Patent  (10) Patent No.: US 8,222,521 B2
Kimbrell et al.  (45) Date of Patent: Jul. 17, 2012

(54) MULTI-PIECE COVERPLATE ASSEMBLY AND MODULAR DEVICE ASSEMBLY

(75) Inventors: Eddie Kimbrell, Dacula, GA (US); Ted Lichoulas, Simpsonville, SC (US)

(73) Assignee: AFL Telecommunications LLC, Spatanburg, SC (US)

( * ) Notice: Subject to any disclaimer, the term of this patent is extended or adjusted under 35 U.S.C. 154(b) by 267 days.

(21) Appl. No.: 12/513,604

(22) PCT Filed: Jun. 18, 2008

(86) PCT No.: PCT/US2008/067297
§ 371 (c)(1),
(2), (4) Date: Mar. 18, 2010

(87) PCT Pub. No.: WO2008/157579
PCT Pub. Date: Dec. 24, 2008

(65) Prior Publication Data
US 2010/0186986 A1  Jul. 29, 2010

Related U.S. Application Data

(60) Provisional application No. 60/944,607, filed on Jun. 18, 2007.

(51) Int. Cl.
*H02G 3/14* (2006.01)

(52) U.S. Cl. .............................. 174/66; 174/67; 220/241
(58) Field of Classification Search ................... 174/66, 174/67; 220/241, 242; 439/136; 312/328
See application file for complete search history.

(56) References Cited

U.S. PATENT DOCUMENTS

| | | | | |
|---|---|---|---|---|
| 3,437,737 | A * | 4/1969 | Wagner | 174/55 |
| 3,437,738 | A * | 4/1969 | Wagner | 174/55 |
| 4,717,358 | A | 1/1988 | Chaundy | |
| 4,803,380 | A | 2/1989 | Jacoby, Jr. et al. | |
| 4,835,343 | A * | 5/1989 | Graef et al. | 174/66 |
| 5,096,439 | A | 3/1992 | Arnett | |
| 5,153,816 | A * | 10/1992 | Griffin | 361/832 |
| 5,189,259 | A * | 2/1993 | Carson et al. | 174/66 |
| 5,344,327 | A | 9/1994 | Brunker et al. | |
| 5,457,286 | A * | 10/1995 | Flasz | 174/66 |
| 7,071,414 | B2 * | 7/2006 | Kim | 174/66 |
| 7,075,009 | B1 * | 7/2006 | Rohmer | 174/66 |
| 7,122,740 | B2 * | 10/2006 | Xu et al. | 174/66 |
| 7,279,637 | B1 * | 10/2007 | O'Young et al. | 174/66 |
| 7,456,358 | B2 * | 11/2008 | Swiencicki et al. | 174/66 |
| 2003/0142664 | A1 | 7/2003 | Gerszberg et al. | |
| 2005/0022054 | A1 | 1/2005 | Rasmussen et al. | |
| 2005/0142941 | A1 | 6/2005 | Borgstrom et al. | |

* cited by examiner

Primary Examiner — Dhirubhai R Patel
(74) Attorney, Agent, or Firm — Sughrue Mion, PLLC

(57) ABSTRACT

A multi-piece coverplate assembly provides a multi-piece coverplate and modular device assembly which is removably fastened to the multi-piece coverplate.

29 Claims, 5 Drawing Sheets

MULTI-PIECE COVERPLATE ASSEMBLY AND MODULAR DEVICE ASSEMBLY

CROSS-REFERENCE TO RELATED APPLICATIONS

This application claims the benefit of Provisional Application No. 60/944,607 filed Jun. 18, 2007. The entire disclosure of the prior application, Application No. 60/944,607, is hereby incorporated by reference.

BACKGROUND OF THE INVENTION

1. Field of the Invention

Apparatuses consistent with the present invention relate to coverplates for covering wiring and/or device enclosures, and a modular device assembly. More particularly, the present invention relates to multi-piece coverplates for covering wiring and/or device enclosures, and a modular device assembly.

2. Description of the Related Art

Current two and three piece coverplate assemblies are used primarily on electrical devices such as light switches and electrical receptacles. The electrical device typically includes mounting ears and is attached to an enclosure box using screws passing through the mounting ears. A cover plate is then fastened to the electrical device completing the installation.

Two-piece cover plate assemblies are also known. Two-piece cover plate assemblies in use today require an underlying cover attachment plate (inner component) to be mounted by screws directly to the electrical device being covered. An outer cover plate is then attached to the cover attachment plate. These current two-piece cover plate designs have several problems and/or disadvantages as discussed below.

Existing two piece coverplates become easily dislodged from one another by accidental contact.

Existing two piece assemblies allow dust and debris to accumulate at the interface/separation plane of the two parts and are a potential pathway for ingress of liquids into the enclosure resulting in potential shock hazards. Further, the unsightly gap between the two parts results in a clunky, unfinished appearance of one piece stacked upon another and is not aesthetically pleasing.

Existing coverplate assemblies do not make provisions for replacing the external cover plate independently of the entire unit. When the outer coverplate becomes damaged or color coordinated coverplates are desired, the complete assembly has to be purchased, rather than only the external cover plate, requiring unnecessary expense and skilled labor to replace.

Many of the two piece coverplates in the marketplace today attach to each other by means of long snap fingers which can be easily broken upon installation or reinstallation.

Existing two piece coverplates lack provisions for hanging a device such as a telephone or other device from the coverplate. A separate, special coverplate must be purchased and installed by skilled labor at considerable expense.

Existing two piece coverplate assemblies do not provide a means to mount a circuit card assembly directly to the enclosure box.

Existing two piece coverplate assemblies do not provide an inner coverplate component that is scalable/upgradeable and configurable for addition of future telecommunication, video and Ethernet (triple play) connection technologies.

Existing two piece coverplate assemblies do not provide protected, yet convenient, access to system level configuration changes to the network.

SUMMARY OF THE INVENTION

Exemplary embodiments of the present invention address at least the above problems and/or disadvantages and other disadvantages not described above. Also, the present invention is not required to overcome the disadvantages described above, and an exemplary embodiment of the present invention may not overcome any of the problems described above.

According to an aspect of the present invention, there is provided a multi-piece coverplate assembly which includes a multi-piece coverplate and a modular device assembly which is removably fastened to the multi-piece coverplate.

According to another aspect of the present invention, there is provided a multi-piece coverplate including an inner base coverplate and an outer coverplate which is removably fastened to the inner base coverplate.

According to yet another aspect of the present invention, there is provided an inner base coverplate including means for attaching the inner base coverplate, and at least one mounting boss extending from a first surface, wherein the at least one mounting boss retains a fastener.

BRIEF DESCRIPTION OF THE DRAWINGS

These and/or other aspects of the present invention will become apparent and more readily appreciated from the following description of the exemplary embodiments, taken in conjunction with the accompanying drawings, in which.

DETAILED DESCRIPTION OF THE INVENTION

Figure 1:
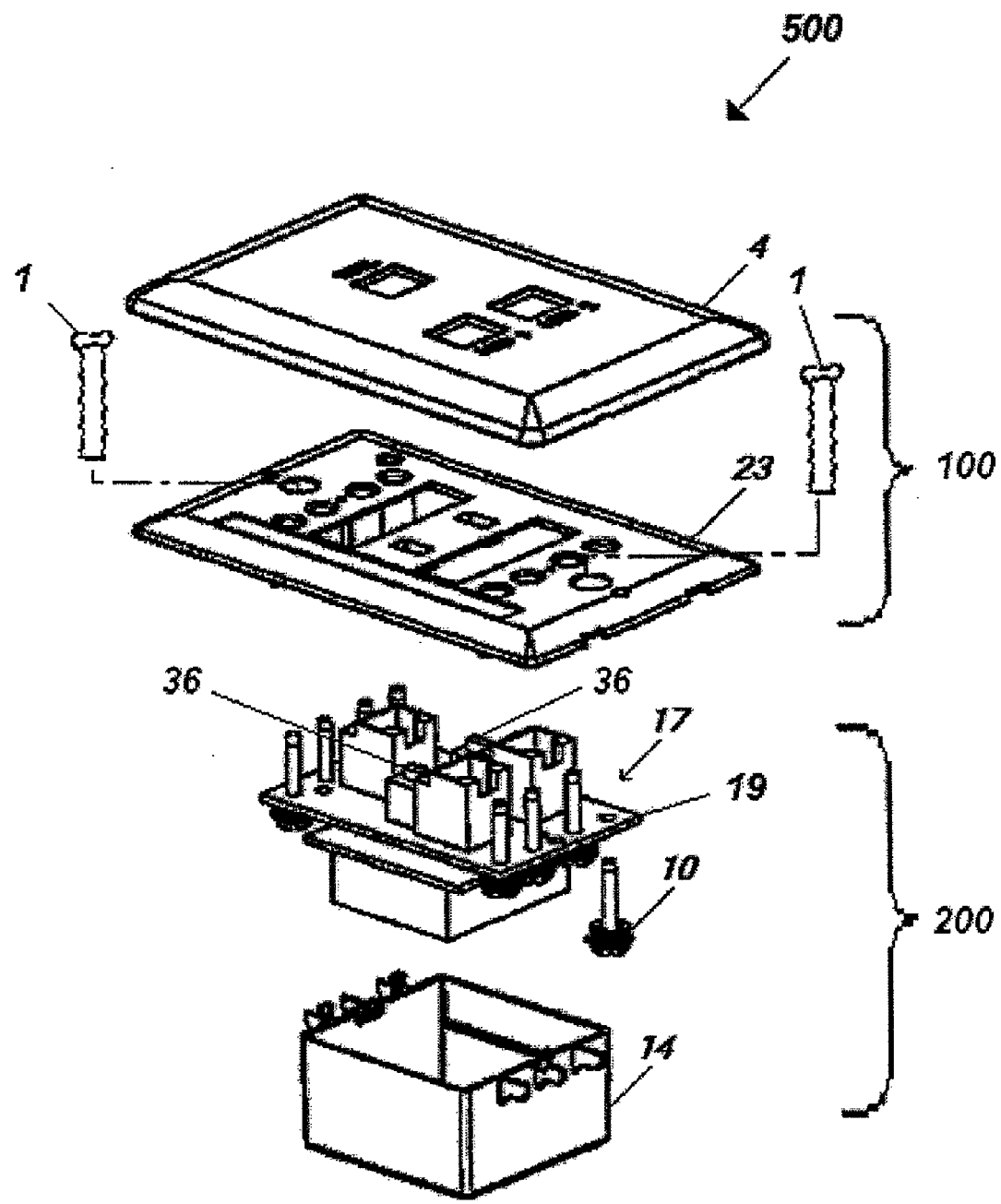
FIG. 1 is an exploded view illustrating an exemplary embodiment of a multi-piece coverplate assembly.

In the following description, same drawing reference numerals are used for the same elements even in different drawings. The matters defined in the description, such as detailed construction and element descriptions, are provided to assist in a comprehensive understanding of the invention. Also, well-known functions or constructions are not described in detail since they would obscure the invention in unnecessary detail.

FIG. 1 is an exploded view illustrating an exemplary embodiment of a multi-piece coverplate assembly 500 which includes a multi-piece coverplate 100 and modular device assembly 200. As illustrated in FIG. 1, the multi-piece coverplate 100 includes an inner base coverplate 23, and an outer coverplate 4 which attaches to the inner base coverplate 23. The modular device assembly 200 includes a circuit card assembly (CCA) 17 which may include one or more printed circuit boards (PCBs).

The modular device assembly 200 may be attached to the inner base coverplate 23 using device mounting fasteners 10. A cover 14 may be attached to the CCA 17. The inner base coverplate 23 does not require mounting to a device since it is mounted directly to an enclosure (not shown) with fasteners 1, for example, but not limited to, 6-32 UNC fasteners.

Retention of the outer coverplate 4 to the inner base coverplate 23 is achieved by a unique multi-position hook and catch type mechanism. The inner base coverplate 23 may have a plurality of receiving catches 24 which are positioned around the perimeter of the inner base coverplate 23.

Figure 2:
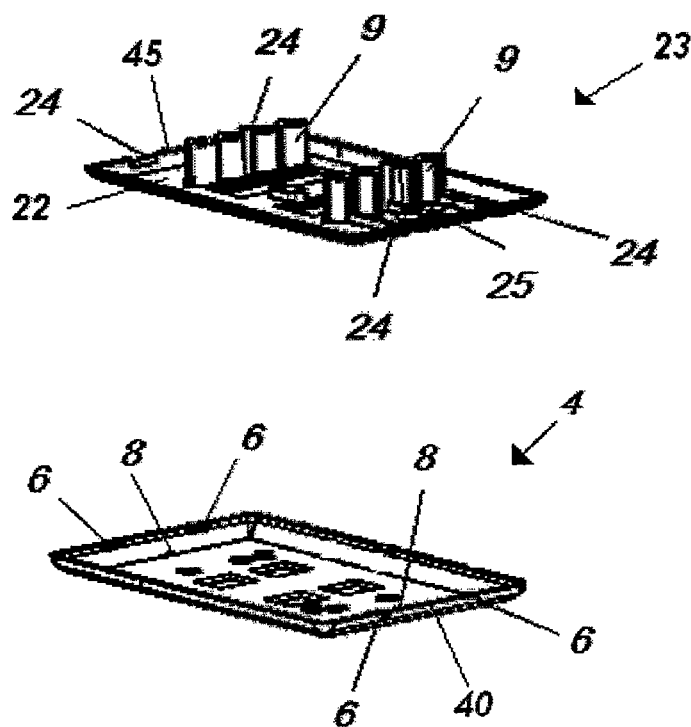
FIG. 2 is a perspective view illustrating an exemplary embodiment of an inner base coverplate and an outer coverplate of a multi-piece coverplate.
Figure 3:
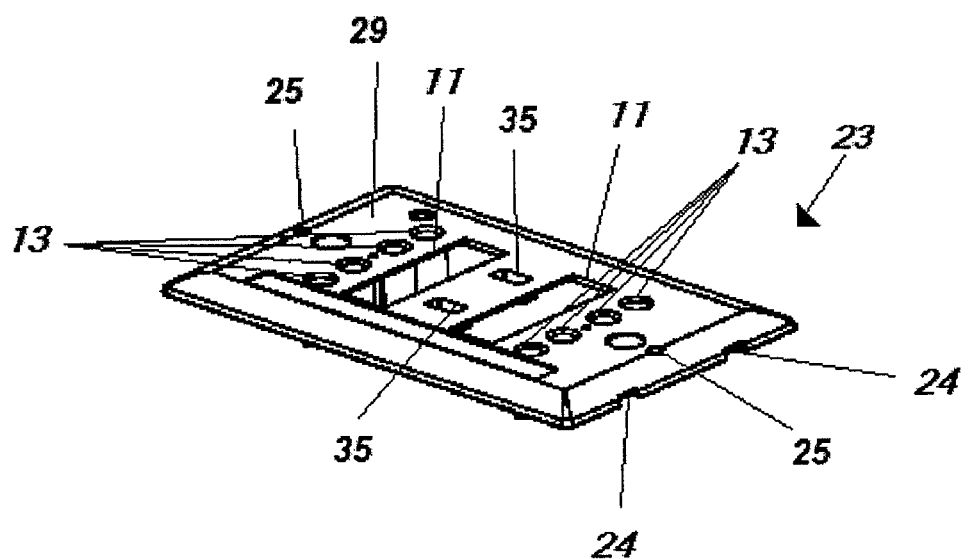
FIG. 3 is a perspective view illustrating an exemplary embodiment of the inner base coverplate.

FIG. 2 is a perspective view illustrating an exemplary embodiment of an inner base coverplate and an outer coverplate of a multi-piece coverplate, and FIG. 3 is a perspective view illustrating an exemplary embodiment of the inner base coverplate. In an exemplary embodiment, the inner base coverplate 23 has four receiving catches 24 which are positioned around the perimeter a first edge 45 of the inner base coverplate 23 such that two receiving catches 24 are positioned spaced apart on one side of the first edge 45 of the perimeter of the inner base coverplate 23 and two receiving catches 24 are positioned spaced apart on an opposite side of the first edge 45 of the perimeter of the inner base coverplate 23.

A plurality of retaining hooks 6 on the outer coverplate 4 have angled surfaces with radiused entry surfaces and interlocking mating surfaces. Among the benefits of this arrangement are ensuring reliability and preventing premature breakage. The receiving catches 24 on the inner base coverplate 23 have surfaces that are angled less than normal to the retaining hook 6 entry surfaces of the outer coverplate 4. The plurality of retaining hooks 6 on the outer coverplate 4 are positioned so as to engage the plurality of receiving catches 24 on the inner base coverplate 23.

Alternatively, the outer coverplate 4 may be retained to the inner base coverplate 23 using fasteners, for example, but not limited to, screws, metal clips, plastic "Christmas tree" type fasteners, Velcro, double sided tape, retaining rings, glue, labels, snap fits of different geometry than described above, push fasteners, grommets, plastic clips, standoffs, an addition of a separate part to facilitate the attachment of the two parts, clamps, frame work bezel type, rivets, tongue and groove slide fit, and force fit.

In the exemplary embodiment, the outer coverplate 4 has four retaining hooks 6 which are positioned around the perimeter of a first edge 40 of the outer coverplate 4 such that two retaining hooks 6 are positioned spaced apart on one side of the first edge 40 of the perimeter of the outer coverplate 4 and two retaining hooks 6 are positioned spaced apart on an opposite side of the first edge 40 of the perimeter of the outer coverplate 4.

Figure 7:
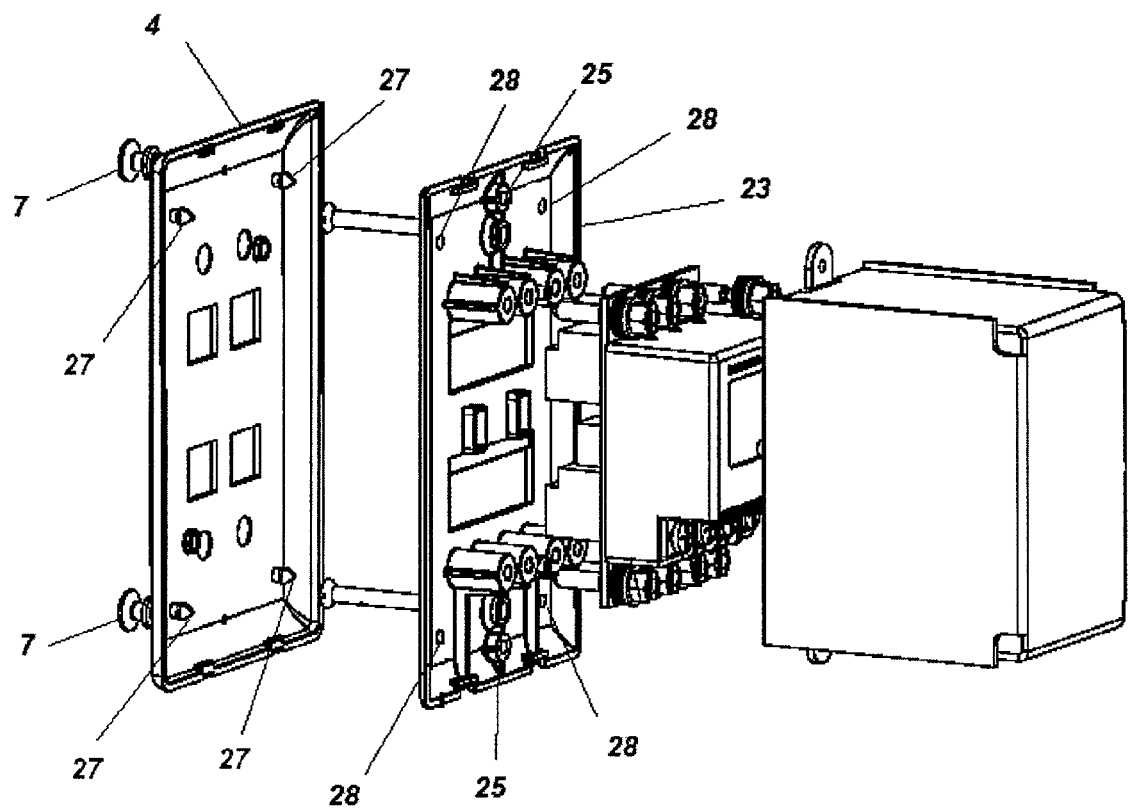
FIG. 7 is a perspective view illustrating another exemplary embodiment of an inner base coverplate and an outer coverplate of a multi-piece coverplate.

In another exemplary embodiment illustrated in FIG. 8, a plurality of snap fit post catches 27 disposed on the outer coverplate 4 correspond to a life plurality of receiving holes 28 disposed in the inner coverplate 23 to retain the outer coverplate 4 to the inner coverplate 23. The exemplary embodiment of FIG. 7 illustrates four snap fit post catches 27 and four receiving holes 28, however, other exemplary embodiments are not limited to that number and may include more or less than four snap fit post catches 27 and receiving holes 28.

Referring again to FIGS. 2 and 3, the inner base coverplate 23 may include one or more screw lug bosses 25 which accept mounting screw lugs 7 to which devices, for example, but not limited to, telephones, are mounted to the multi-piece coverplate assembly 100. The outer coverplate 4 may include locators 8 which indicate locations for creating one or more clearance holes for the mounting screw lugs 7 to pass through the outer coverplate 4 and into the one or more of the screw lug bosses 25 on the inner base coverplate 23.

The inner base coverplate 23 may include mounting bosses 9 extending from a first surface 22 of the inner base coverplate 23 to which the modular device assembly 200 may be mounted.

Figure 5:
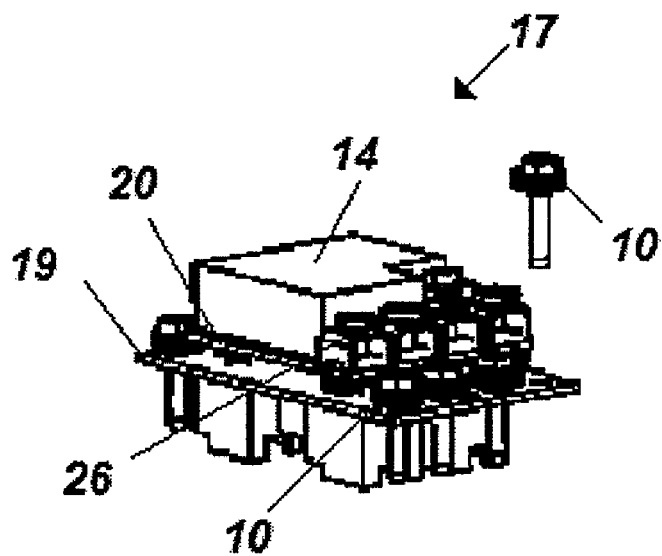
FIG. 5 is a perspective view illustrating an exemplary embodiment of a modular device assembly.

FIG. 5 is a perspective view illustrating an exemplary embodiment of a modular device assembly. In the exemplary embodiment, the modular device assembly 200 includes a CCA 17 having a first PCB 19 and a second PCB 20. One of ordinary skill in the art will understand that the CCA 17 may include more or less than the number of PCBs illustrated by the exemplary embodiment and the PCBs may have configuration is different than those illustrated by the exemplary embodiment. Alternatively, the CCA 17 may have no printed circuit boards. The modular device assembly 200 is mounted using a plurality of mounting fasteners 10 that pass through the first PCB 19 of the CCA 17 and fasten the device assembly 200 to the mounting bosses 9.

The fasteners may include, but are not limited to, screws, bolts, rivets, metal pins for solder connection, quarter-turn fasteners and metal clips. Alternatively, the modular device assembly 200 may be retained to the inner base coverplate 23 with, for example, but not limited to, plastic "Christmas tree" type fasteners, retaining rings, glue, snap fit, push fasteners, grommets, plastic clips, snap fingers, heat staking via protruding molded pins, and bonding.

The plastic inner base coverplate 23 provides electrical insulation in the event that an electrically live conductor contacts a metallic enclosure to which the inner base coverplate 23 is mounted by the fact that the fasteners 1 pass through the plastic inner base coverplate 23 and attach to the enclosure. The plastic inner base coverplate 23 therefore does not provide an electrical path for current from the metallic enclosure.

The mounting fasteners 10 make electrical contact with conductive pads on the CCA 17 and thereby providing electrical connections to connected wiring, for example, but not limited to network wiring. The CCA 17 may include additional wiring terminals for providing electrical wiring connections to, for example but not limited to, telephone system wiring. In an exemplary embodiment, the CCA 17 includes the second PCB 20 which provides wiring terminals 26.

Referring again to FIG. 3, the mounting bosses 9 incorporate core-outs 13 at a second surface 29 of the inner base coverplate 23 which provide access to the ends of the mounting fasteners 10 used to mount the device assembly 200 to the inner base coverplate 23, allowing the mounting fasteners 10 to function as electrical test points.

Figure 6:
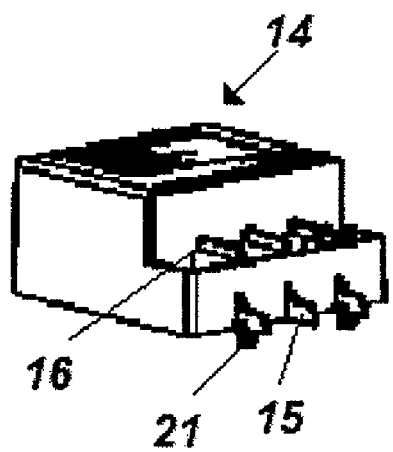
FIG. 6 is a perspective view illustrating an exemplary embodiment of a cover.

The CCA 17 may be electrically shielded as well as protected by a cover 14. FIG. 6 is a perspective view illustrating an exemplary embodiment of a cover. The cover may be constructed from molded plastic and may have at least one metalized surface. Alternatively, the cover may be constructed from electrically conductive material, for example, but not limited to, aluminum. In an exemplary embodiment, the cover 14 may be attached to the CCA 17 with snap fit posts 21. The cover 14 may be removed from the CCA 17 and reinstalled by virtue of the snap fit posts 21 without removing additional fasteners or other components of the device. The cover 14 may have ribs, which may be integrally formed with the cover 14, and which may be positioned between the mounting fasteners 10 and/or between the wiring terminals 26.

The ribs separate adjacent mounting fasteners 10 from one another and separate adjacent wiring terminals from one another. In an exemplary embodiment, first ribs 15 on the cover 14 are positioned between adjacent mounting fasteners 10, and second ribs 16 on the cover 14 are positioned between adjacent wiring terminals 26. This partitioning of the terminals helps to prevent short circuiting of the wiring by not allowing wires from one terminal position to come in contact with wires of an adjacent terminal position. The cover 14 may also have apertures (not shown) for accessing switches and screw terminals.

The inner base coverplate 23 is scalable and configurable and may provide multiple apertures 11 of various shapes and sizes for accepting connectors such as, but not limited to, RJ Jacks, F-Connectors, screw terminals, and other audio, video, electrical and optical connectors of the modular device assembly 200.

Figure 4:
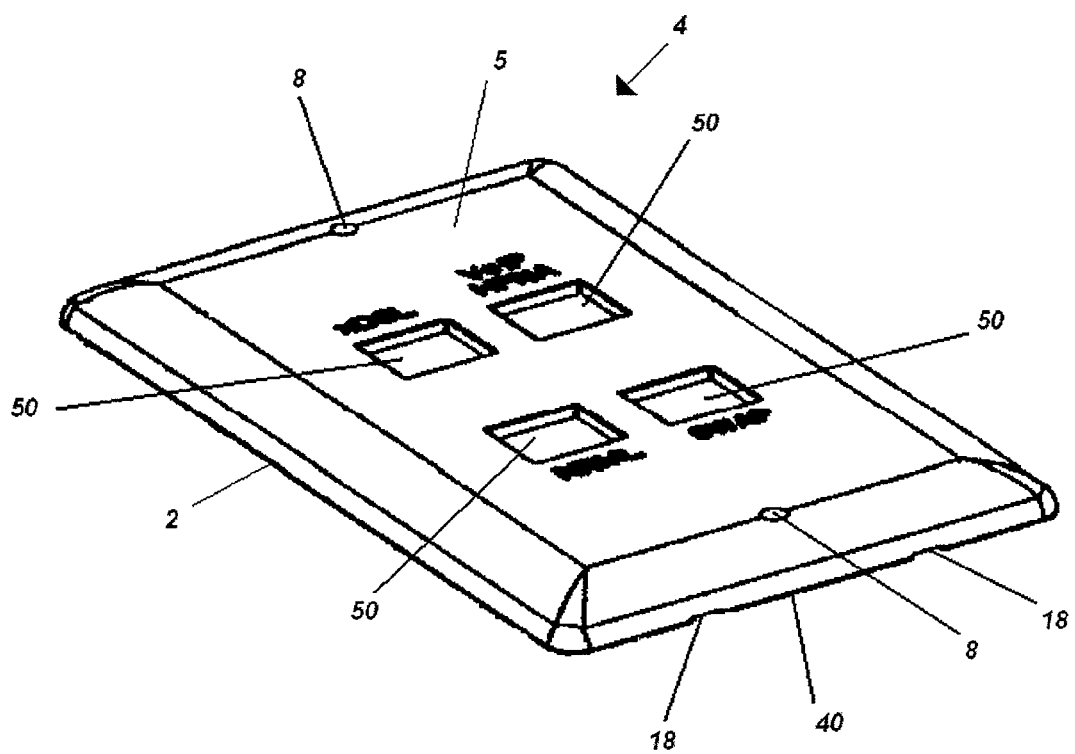
FIG. 4 is a perspective view illustrating an exemplary embodiment of the outer coverplate.

FIG. 4 is a perspective view illustrating an exemplary embodiment of the outer coverplate. The outer coverplate 4 may provide apertures 50 which allow access for connections to be made to the connectors. Alternatively, a blank or non-aperture configuration of the outer coverplate 4 may block access to the connectors if access to the connected wiring is desired to be terminated, or if the outlet is no longer required.

The outer coverplate 4, when removed from the inner base coverplate 23, may provide access to switches and test points on the modular device assembly 200 via the apertures 35 and core-outs 13 in the inner base coverplate 23. In an exemplary embodiment of the present invention, switches 36 may be accessed through apertures 35, and mounting fasteners 10 functioning as test points can be accessed through core-outs 13. While the exemplary embodiment provides two apertures, two switch apertures and eight core-outs, one of ordinary skill in the art will recognize that other exemplary embodiments are not limited to this configuration and may provide a plurality of apertures, switch apertures and core-outs.

The apertures 11 in the inner base wall plate 23 may be configured to accept any type of tool required to manipulate the device/wiring that may be made accessible.

Access to wiring connections at the mounting fasteners 10 and wiring terminals 26 can be gained by removing the outer coverplate 4 and removing the inner base wall plate 23/modular device assembly 200 assembly from the enclosure by removing the fasteners 1 holding the inner base wall plate 23 to the enclosure.

The multi-piece coverplate assembly 500 may be easily installed in new as well as existing structures with tools that are normal and customary in the building trades.

Alternatively, the multi-piece coverplate 100 without the modular device assembly 200 may be installed, allowing for future upgrades in a building and/or a network. In addition, the mounting screw lugs 7 (see FIG. 7) for mounting devices, for example, but not limited to, telephones, can be added at the initial installation or at any time after the original installation. The option for future installation of these additional components provides a significant potential cost savings to customers by allowing for deployment of an increased number of potential locations without the immediate cost purchasing complete devices.

The envelope of the modular device assembly 200 has been sized and contoured to allow the assembly to fit inside a range of enclosures available today. The modular device assembly 200 will fit inside the plastic enclosures used in current new construction as well as the smaller metallic old style workboxes with less internal volume used in some homes, multi-dwelling units and buildings in older markets.

During installation of the outer coverplate 4 to the inner base coverplate 23 on one exemplary embodiment, the convergence of the interlocking surfaces causes the retaining hooks 6 on the outer coverplate 4 to contact and ride along the mating surfaces of the inner base coverplate 23 and flex outward until they no longer interfere with each other and snap into place. The successful completion of the correct assembly method is confirmed to the user by the sound of a click. This important, novel and unique audible feedback ensures that the outer coverplate 4 is securely attached to the inner base coverplate 23 and the coverplate assembly 100 is prepared for use.

The hook and catch mechanism employs similar mechanics and provides structural integrity such that when the outer coverplate 4 is removed from the inner base coverplate 23, the disengagement of the retaining hooks 6 on the outer coverplate 4 from the receiving catches 24 on the inner base coverplate 23 does not impart excessive stress and cause premature failure of either member. This type of fastening does not rely on long cantilevered fingers which can easily be broken during installation and/or removal of the outer coverplate 4. The resulting assembly is significantly more robust and durable than currently available products.

The outer coverplate 4 provides restricted access, security and protection to the device by covering and obscuring the fasteners 1 required to gain access to components within the device as well as access to the connected wiring.

When installed on an enclosure, the outer coverplate 4 attaches to and completely covers the inner base coverplate 23 eliminating a peripheral gap common to existing two-piece coverplates. The outer coverplate 4 seats flush against the surface into which the enclosure is installed. Access to edges 2 of the outer coverplate 4 is minimized such that the outer coverplate 4 is not easily dislodged from the inner base coverplate 23 as a result of accidental contact.

The outer coverplate 4 can be removed by placing a tool or other instrument into one of the access recesses 18 on the outer coverplate 4 and prying or pulling outward until the outer coverplate 4 separates from the inner base coverplate 23. Special tools are not required to remove the outer coverplate 4.

Removal of the outer coverplate 4 provides access to the device connection terminals 10 via the core-outs 13 providing contact points for using test equipment to test and troubleshoot the modular device assembly 200 as well as the upstream and downstream network. This novel and time saving feature provides access to the modular device assembly 200 and allows monitoring of network traffic without disrupting data flow. Modular device assembly 200 testing and network monitoring may be performed without removing the modular device assembly 200 from either the network or the enclosure. As a result, no disruption of service is required.

Embodiments of the multi-piece coverplate assembly 500 provide the additional advantages that the outer coverplate 4 can be purchased separately purchased and replaced if damaged or to change the color of the outer coverplate 4. The outer coverplate 4 can be produced in a variety of colors and/or embossed with any type of color, logo, graphics or nameplate.

In addition, the multi-piece coverplate assembly is aesthetically pleasing to the eye and has a smooth and contiguous surface 5 all around the exterior of the part. The smooth and polished surfaces are easy to clean, and there are no visible mating part gaps as with existing assemblies available today. Alternatively, the multi-piece coverplate assembly may have textured surfaces and/or incorporate various decorative design features.

Also, the multi-piece coverplate assembly 500 is modular and can accommodate new design configurations for upgrades to the modular device assembly 200. Upon re-configuration, the outer coverplate 4 may be changed to an outer coverplate designed to match a new connector configuration of the modular device assembly 200.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A multi-piece coverplate assembly, comprising:
a multi-piece coverplate; and
at least one modular device assembly,
wherein the multi-piece coverplate comprises:
an inner base coverplate; and
an outer coverplate,
wherein the outer coverplate is removably fastened to the inner base coverplate with a plurality of receiving catches positioned around a perimeter of an edge of the inner base coverplate, the receiving catches engaging a corresponding plurality of retaining hooks positioned around a perimeter of an edge of the outer coverplate,
wherein the retaining hooks have angled surfaces with radiused entry surfaces and the receiving catches have surfaces that are angled less than normal to the retaining hook entry surfaces, and
wherein the modular device assembly is removably fastened to the inner base coverplate.

2. The multi-piece coverplate assembly according to claim 1, wherein the modular device assembly is a telephone interface device.

3. The multi-piece coverplate assembly according to claim 1 wherein the modular device assembly is a network interface device.

4. The multi-piece coverplate assembly according to claim 1 wherein the modular device assembly is an audio interface device.

5. The multi-piece coverplate assembly according to claim 1 wherein the modular device assembly is a video interface device.

6. The multi-piece coverplate assembly according to claim 1 wherein the modular device assembly is a fiber optic interface device.

7. The multi-piece coverplate assembly according to claim 1, wherein the outer coverplate is removably fastened to a plurality of inner base coverplates.

8. The multi-piece coverplate assembly according to claim 1, wherein the inner base coverplate comprises at least one mounting boss extending from a first surface of the inner base coverplate,
wherein the modular device assembly is removably fastened to the at least one mounting boss with a fastener.

9. The multi-piece coverplate assembly according to claim 8 wherein said fastener is an electrically conductive fastener.

10. The multi-piece coverplate assembly according to claim 8, wherein the at least one mounting boss provides access to an end of the fastener through an opening disposed in the inner base coverplate, and
wherein the fastener provides electrical contact to an electrical test point on the modular device assembly.

11. The multi-piece coverplate assembly according to claim 10, wherein the inner base coverplate further comprises at least one aperture.

12. The multi-piece coverplate assembly according to claim 1, wherein the inner base coverplate further comprises at least one aperture.

13. The multi-piece coverplate assembly according to claim 1, wherein the modular device assembly is fastened to the inner coverplate with electrically conductive fasteners, wherein the electrically conductive fasteners provide electrical connections between the modular device assembly and network wiring.

14. The multi-piece coverplate assembly according to claim 13, wherein the modular device assembly comprises a plurality of wiring terminals.

15. The multi-piece coverplate assembly according to claim 14, wherein the modular device assembly further comprises a cover.

16. The multi-piece coverplate assembly according to claim 15, wherein the cover comprises ribs which are disposed between adjacent wiring terminals.

17. The multi-piece coverplate assembly according to claim 13, wherein the modular device assembly further comprises a cover.

18. The multi-piece coverplate assembly according to claim 17, wherein the cover comprises ribs which are disposed between adjacent electrically conductive fasteners.

19. The multi-piece coverplate assembly according to claim 1, further comprising means for mounting external devices.

20. A multi-piece coverplate, comprising:
an inner base coverplate; and
an outer coverplate removably fastened to the inner base coverplate with a plurality of receiving catches positioned around a perimeter of an edge of the inner base coverplate, the receiving catches engaging a corresponding plurality of retaining hooks positioned around a perimeter of an edge of the outer coverplate,
wherein the retaining hooks have angled surfaces with radiused entry surfaces and the receiving catches have surfaces that are angled less than normal to the retaining hook entry surfaces.

21. The multi-piece coverplate according to claim 20, wherein the outer coverplate is removably fastened to a plurality of inner coverplates.

22. The multi-piece coverplate according to claim 20, wherein the inner base coverplate comprises at least one mounting boss extending from a first surface of the inner base coverplate,
wherein the at least one mounting boss retains a fastener.

23. The multi-piece coverplate according to claim 22, wherein the at least one mounting boss provides access to an end of the fastener through an opening disposed in the inner base coverplate.

24. The multi-piece coverplate according to claim 23, wherein the inner base coverplate further comprises at least one aperture.

25. The multi-piece coverplate according to claim 20, wherein the inner base coverplate further comprises at least one aperture.

26. The multi-piece coverplate according to claim 20, further comprising means for mounting external devices.

27. An inner base coverplate, comprising:
a plurality of receiving catches positioned around a perimeter of an edge of the inner base coverplate, the receiving catches engaging a corresponding plurality of retaining hooks positioned around a perimeter of an edge of an outer coverplate to attach the inner base coverplate to the outer coverplate; and
at least one mounting boss extending from a first surface of the inner base coverplate, wherein the at least one mounting boss retains a fastener and provides access to an end of the fastener through an opening disposed in the inner base coverplate, and wherein the retaining hooks have angled surfaces with radiused entry surfaces and the receiving catches have surfaces that are angled less than normal to the retaining hook entry surfaces.

28. The inner base coverplate according to claim 27, further comprises at least one aperture.

29. The inner base coverplate assembly according to claim 27, further comprising means for mounting external devices.

* * * * *